(12) United States Patent
Bachman et al.

(10) Patent No.: US 12,014,599 B2
(45) Date of Patent: Jun. 18, 2024

(54) GAMING REWARDS TRACKING AND FULFILLMENT

(71) Applicant: LNW Gaming, Inc., Las Vegas, NV (US)

(72) Inventors: William Bachman, Henderson, NV (US); Dennis Lockard, Tracy, CA (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/483,036

(22) Filed: Sep. 23, 2021

(65) Prior Publication Data

US 2022/0092932 A1 Mar. 24, 2022

Related U.S. Application Data

(60) Provisional application No. 63/082,002, filed on Sep. 23, 2020.

(51) Int. Cl.

| | |
|---|---|
| *G07F 17/32* | (2006.01) |
| *G06Q 30/0207* | (2023.01) |
| *G06Q 30/0226* | (2023.01) |
| *G06Q 50/34* | (2012.01) |

(52) U.S. Cl.
CPC ..... *G07F 17/3253* (2013.01); *G06Q 30/0222* (2013.01); *G06Q 30/0233* (2013.01); *G06Q 50/34* (2013.01); *G07F 17/3213* (2013.01); *G07F 17/3237* (2013.01); *G07F 17/3293* (2013.01)

(58) Field of Classification Search
CPC ............ G07F 17/3253; G07F 17/3213; G07F 17/3237; G07F 17/3293; G06Q 30/0222; G06Q 30/0233; G06Q 50/34
See application file for complete search history.

(56) References Cited

U.S. PATENT DOCUMENTS

| | | | | |
|---|---|---|---|---|
| 4,869,500 A | * | 9/1989 | Williams | G07F 17/32 463/2 |
| 5,816,918 A | * | 10/1998 | Kelly | G07F 17/3248 463/16 |
| 5,851,147 A | * | 12/1998 | Stupak | G07F 17/3244 D21/370 |
| 6,033,307 A | * | 3/2000 | Vancura | G07F 17/32 273/138.2 |
| 6,068,552 A | * | 5/2000 | Walker | G07F 17/3244 463/20 |

(Continued)

*Primary Examiner* — Dmitry Suhol
*Assistant Examiner* — Jason Pinheiro

(57) ABSTRACT

A system and methods for tracking and fulfillment of casino gift items. For instance, the system animates a list gifts that are available to the player account via a casino promotion. One or more of the gift items can be pre-selected before being earned. The pre-selected gift items appear on a user interface that combines content for the gift promotion with content for a wagering game played during the player account session. A progress meter, for each gift item, shows an incremental increase in rewards points until enough rewards points accrue to redeem the gift item. The system automatically interfaces with a store front that provides the gift item. The system transacts fulfillment of the gift redemption and initiates (via the store front) the shipment of the gift item directly to a mailing address associated with the player account.

21 Claims, 9 Drawing Sheets

(56) References Cited

U.S. PATENT DOCUMENTS

| | | | | |
|---|---|---|---|---|
| 6,179,710 | B1 * | 1/2001 | Sawyer | G07F 17/3288 463/16 |
| 6,241,608 | B1 * | 6/2001 | Torango | G07F 17/32 463/16 |
| 6,315,665 | B1 * | 11/2001 | Faith | G07F 17/3262 463/16 |
| 6,358,147 | B1 * | 3/2002 | Jaffe | G07F 17/34 463/20 |
| 6,443,843 | B1 * | 9/2002 | Walker | G06Q 20/20 705/16 |
| 6,454,649 | B1 * | 9/2002 | Mattice | G07F 17/32 463/19 |
| 6,857,959 | B1 * | 2/2005 | Nguyen | G07F 17/3262 700/91 |
| 7,390,264 | B2 * | 6/2008 | Walker | G06Q 30/0211 463/40 |
| 7,753,772 | B1 * | 7/2010 | Walker | A63F 13/85 463/16 |
| 7,780,522 | B2 * | 8/2010 | Lutnick | G06Q 20/387 463/25 |
| 8,241,123 | B2 | 8/2012 | Kelly et al. | |
| 8,251,791 | B2 * | 8/2012 | Baerlocher | G07F 17/3258 463/19 |
| 8,357,034 | B2 * | 1/2013 | Smith | G07F 17/32 463/25 |
| 8,512,131 | B2 * | 8/2013 | Iddings | G07F 17/3244 463/25 |
| 8,900,053 | B2 * | 12/2014 | Graham | G07F 17/32 463/27 |
| 9,159,193 | B2 * | 10/2015 | Walker | G07F 17/3216 |
| 9,972,171 | B2 * | 5/2018 | Marston | G07F 17/3246 |
| 10,319,183 | B2 * | 6/2019 | Soo | G07F 17/3244 |
| 10,643,431 | B2 | 5/2020 | Chesworth et al. | |
| 11,113,778 | B2 * | 9/2021 | Pimienta | G06Q 20/12 |
| 2002/0077174 | A1 * | 6/2002 | Luciano | G07F 17/32 463/47 |
| 2002/0138342 | A1 * | 9/2002 | Clark | G06Q 30/02 705/14.14 |
| 2006/0211482 | A1 * | 9/2006 | Pimienta | G06Q 30/0603 463/16 |
| 2014/0274308 | A1 * | 9/2014 | Guinn | G07F 17/3244 463/25 |
| 2020/0020065 | A1 * | 1/2020 | Pimienta | G07F 17/326 |

\* cited by examiner

602

```
CREATE PROMOTION                                                            ☒
  PROMOTION  SITES  SCHEDULE  ELIGIBILITY  PRIZE POOL  NOTIFICATION  REVIEW  APPROVAL
  START DATE/TIME  8/24/2020   HOURS: 8 ▼  MINUTES: 43 ▼   ☐ START IMMEDIATELY
  ┌─HOW LONG TO RUN?──────────────────────┐
  │ ● RUN UNTIL PROMOTION IS CANCELED      │
  │ ○ RUN ONE PROMOTION UNTIL END DATE/TIME│────604
  │ ○ RUN UNTIL STOCK IS EMPTY             │
  └────────────────────────────────────────┘
  WHICH SCHEDULE TO USE?  24/7  ▼  (NEW SCHEDULE)   (CANCEL) (PREVIOUS) (NEXT)
```

```
SET REWARD POINTS ELIGIBILITY                                               ☒
  PROMOTION  SITES  SCHEDULE  ELIGIBILITY  PRIZE POOL  NOTIFICATION  REVIEW  APPROVAL
  WAGER TYPE:                ▼  ┌─612
                    ┌──────────────────────┐
                    │  BET AMOUNT          │
              614──│  THEORETICAL ADJ. BET│
                    └──────────────────────┘
  WAGER REQUIREMENT ON  = 👁 ❓  125  % OF WAGER REQUIRED ON NON-CONDITIONAL MACHINES.
  CONDITIONAL MACHINES

ELIGIBILITY CRITERIA:  GOLD CLUB PLAYERS ▼   (CUSTOM) (EDIT) (TEST ELIGIBILITY)
                                                    (CANCEL) (PREVIOUS) (NEXT)
```

FIG. 6B

```
┌───┬──────────────────┬──────────────────┬─────────────────────────────────┐ ☒
│ 👁 │ ELIGIBLE MACHINES│ ELIGIBLE PLAYERS │ ELIGIBLE PLAYERS ON MACHINES COUNT│
│   ├──────────────────┼──────────────────┼─────────────────────────────────┤
│   │        0         │        0         │              0                  │
└───┴──────────────────┴──────────────────┴─────────────────────────────────┘

MACHINE GROUP
  ┌────┬────────────────┐
  │ ID │ NAME           │
  ├────┼────────────────┤
  │ 1  │ POKER MACHINES │
  └────┴────────────────┘

❓  A CONDITIONAL RULE SPECIFYING A GROUP OF MACHINES BASED ON SELECTED GAME TYPE.
      USAGE: CONDITIONAL RULE GIVES A FLEXIBILITY TO SPECIFY DIFFERENT PROMOTION/TOURNAMENT
      COSTS BASED ON PLAYER PLAYING ON SLOT/GAME.

E.G.: WE CAN CREATE A CONDITIONAL GROUP OF POKER AND BLACKJACK MACHINES. SPECIFIED
      PROMOTION COST AS BELOW:
      ON BASE MACHINE: $5
      ON CONDITIONAL MACHINE: $10
```

FIG. 6C

SET PRIZE POOL DETAILS

PROMOTION | SITES | SCHEDULE | ELIGIBILITY | PRIZE POOL | NOTIFICATION | REVIEW | APPROVAL

POOL #: 6   # OF PRIZES: 150 — 716
PRIZE: LAPTOP BAG — 715   DELIVERY OPTIONS: OPTIONS
  ☑ PICK UP AT CASINO
  ☐ SHIP TO ADDRESS

718
WAGER REQUIRED: 200   WAGER REQUIRED ON CONDITIONAL MACHINES: 250 — 719

ALLOWED REDEEM QUANTITY: 5 — 717   AUTO LAUNCH: ☐

720

ADD

| ACTION | POOL ID | # OF PRIZES | PRIZE | DELIVERY OPTIONS | WAGER REQUIRED | WAGER REQUIRED ON CONDITIONAL MACHINES | ALLOWED REDEEM QUANTITY | AUTO LAUNCH |
|---|---|---|---|---|---|---|---|---|
| EDIT/DELETE | 1 | 5 | IPHONE XS | PICKUP\|SHIP | 1000 | 1250 | 1 | ☑ |
| EDIT/DELETE | 2 | 10 | DESIGNER HANDBAG | PICKUP\|SHIP | 800 | 1000 | 2 | ☑ |
| EDIT/DELETE | 3 | 20 | ESPRESSO MAKER | PICKUP\|SHIP | 700 | 875 | 3 | ☑ |
| EDIT/DELETE | 4 | 5 | IPAD | PICKUP\|SHIP | 1000 | 1250 | 1 | ☑ |
| EDIT/DELETE | 5 | 100 | HEADPHONES | PICKUP | 500 | 625 | 4 | ☐ |
| EDIT/DELETE | 6 | 150 | LAPTOP BAG | PICKUP | 200 | 250 | 5 | ☐ |

CANCEL   PREVIOUS   NEXT

FIG. 7

GAMING REWARDS TRACKING AND FULFILLMENT

CROSS-REFERENCE TO RELATED APPLICATION

This application claims the priority benefit of U.S. Provisional Patent Application No. 63/082,002, filed Sep. 23, 2020, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, SG Gaming, Inc.

FIELD OF THE INVENTION

The present invention relates generally to apparatus and methods for gaming rewards and, more particularly, relates to apparatus and methods for gaming reward redemption.

BACKGROUND

Casinos, like other businesses, appreciate the value of repeat business. Consequently, casinos offer gifts and comps for loyal casino patrons. Some casinos have gifting programs that are tied to a player account, such as customer loyalty programs. However, casinos face challenges with regards to gifting programs. Casinos currently face long lines, inventory issues, excessive staffing and reduced revenue due to waiting periods.

A need therefore exists for an apparatus and methods to overcome these, and similar, challenges.

SUMMARY

According to an embodiment of the present disclosure, a system Accesses a player account in response to a login event associated with a gaming device. The system further animates, via the gaming device, available gift item data from an inventory for a gifting promotion. The system further detects, in response to animating the available gift item data, a user selection of a gift item from the inventory. The system further determines that a level of wagering progress, by the player account toward obtaining the gift item, has reached a required progress level. The system further determines, via access to the player account, a mailing address associated with the player account. The system further requests, via a network, that a store front ship a physical instance of the gift item to the mailing address.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIGS. 5A, 5B, 6A, 6B, 6C, and 7 illustrate examples according to one or more embodiments of the present disclosure.

Figure 1:
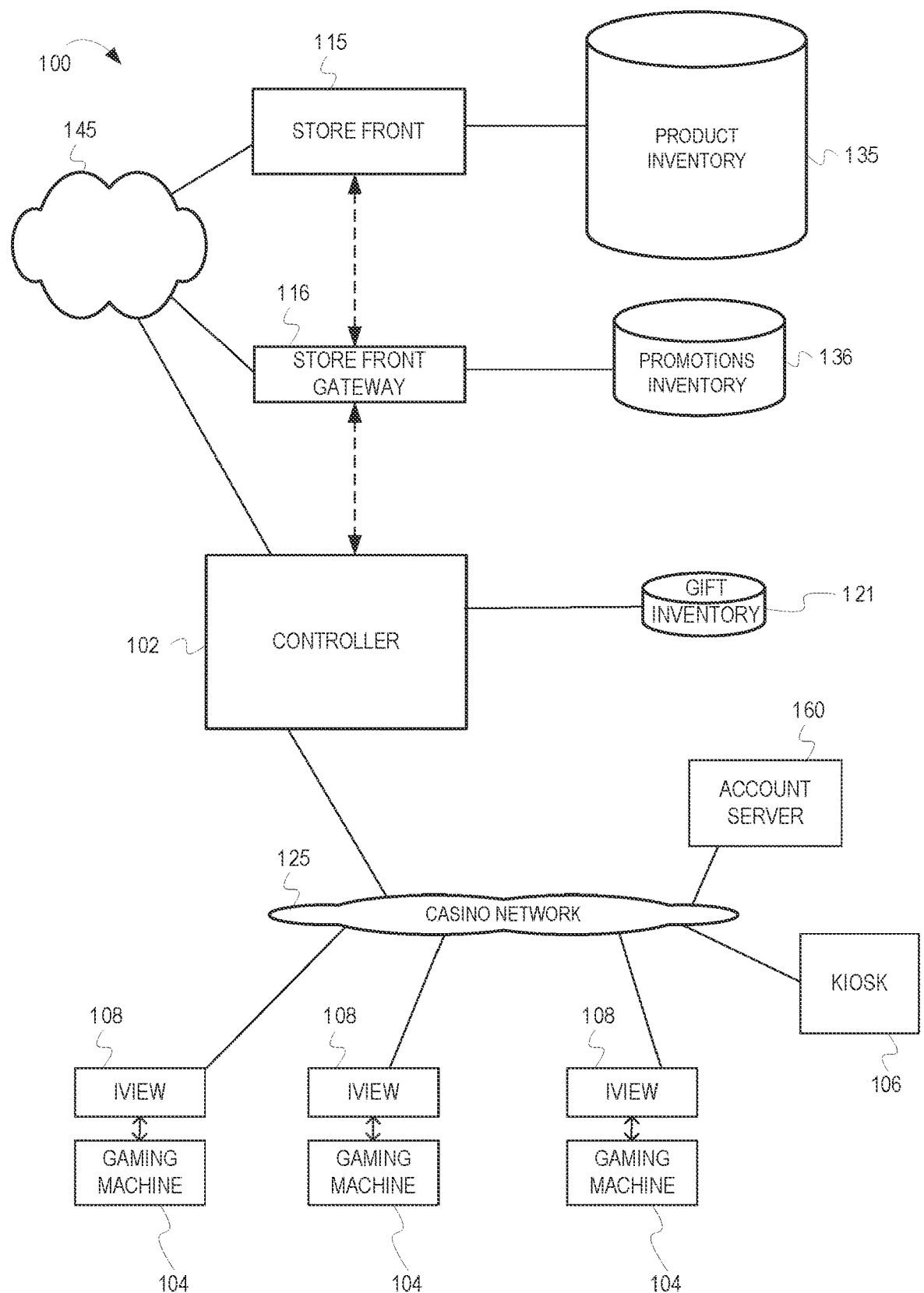
FIG. 1 is a diagram of an example system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is a diagram of an example system 100 according to one or more embodiments of the present disclosure. The system 100 includes an electronic gifting controller (controller 102) communicatively coupled (e.g., via a casino network 125) to various devices in a casino (e.g., gaming machines 104, kiosks 106, etc.). Examples of various devices, including a gaming machine, are described in detail in U.S. Pat. No. 10,643,431 to Chesworth et al., which is hereby is incorporated by reference in its entirety. The controller 102 is also communicatively coupled to an account server 160. The account server 160 controls access to a player account. A player account can be used to login to a gaming session and track information related to a specific casino patron. The player account can store credit data related to gaming credits used for wagering at any one of the gaming machines 104. The player account can further store rewards points data earned by the player account for gambling at the gaming machines 104.

In some embodiments, the controller 102 is also communicatively coupled to one or more iView® player interface products by Scientific Games Corporation (i.e., iViews 108). An example description of the iView® product can be found in U.S. Pat. No. 8,241,123 to Kelly et at, the entirety of which is hereby incorporated by reference. Each iViews 108 is configured to connect to a respective gaming machine 104. In some embodiments, the gaming machine 104 may be the example gaming machine 810 described in FIG. 8. The iView 108 can intercept an image feed of gaming content from the gaming machine 104 and rescale the gaming content to fit as a picture-in-picture within a player user interface that presents content related specifically to the player account (such as customer loyalty benefit information, earned rewards points, player funds, promotions, bonus games, etc.), The iView 108 also provides access to casino services such as electronic drink deliveries, ordering tickets to casino entertainment, redeeming rewards, etc.

The controller 102 may be a server, a desktop computer, a laptop, a smartphone, a gaming machine, or other form of electronic device having one or more processors, a computer memory, an electronic communications system (e.g., a bus, a network interface device, a wireless communications device, etc.), etc. For instance, the controller 102 may be the computer system 900 described in FIG. 9.

The controller 102 is configured to interface (e.g., via communications network 145) with a store front gateway 116. The store front gateway 116 is configured to access a store front server 115 for an online store or e-tailer (such as Amazon.com), that offers products for purchase. The store front server 115 has access to a product inventory 135 for the online store. The store front gateway 116 selects specific items from the product inventory 135 and designates them for use as promotional gifts. The store front gateway 116 stores information about the selected items from the product inventory 135 in the promotions inventory 136. The promotions inventory 136 includes only a subset of the entire product inventory 135. For example, the store front gateway 116 may be associated with a third-party business entity that finds and arranges promotional gifts from one or more store fronts and organizes access to the promotional gift items via the controller 102 to configure promotions, track selections of gift items, and perform electronic transactions with the store front server 115 (to process the purchase and shipping of the gift item on behalf of the player account). When the controller 102 configures a specific gifting promotion from the options available by the store front gateway 116, the controller 102 selects some of the items in the promotions inventory 136 as available gift items to be earned (by player accounts) in one or more casino promotions. The controller 102 thus stores information about the selected promotional items in a gift inventory 121. The gift inventory 121 includes only a subset of the items available in the promotions inventory 136.

The controller 102 is further configured to access player data (via the account server 160), to automatically determine a mailing address, and other necessary information about the earned gift item, to the store front server 115. The store front gateway 116 is configured to communicate via one or more application programming interfaces (APIs) associated with the store front server 115. For instance, the store front gateway 116 can access detailed information about the gift item from a database for the products (e.g., from the product inventory 135), and use the information (e.g., to present a picture of the product, to describe a name for the product, to determine a number of the products available, etc.). The store front gateway 116 is further configured to post orders, get order statuses, cancel orders, etc. via use of the APIs for the store front server 115. For example, the store front gateway 116 is configured to process an order for any of the specific items in the promotions inventory 136. Further, the store front gateway 116 is configured to receive, from the controller 102, player data relevant to shipping of the product (e.g., the store front gateway 116 receives and uses a mailing address associated with a player account).

The controller 102 is configured to communicate with a widget of the iView 108 to present a user interface (e.g., the "Player Boutique" dashboard described in further detail in FIGS. 3A, 3B, 4A, and 4B). The controller 102 is configured to provide (for presentation via the user interface) options for tracking earned reward points that can be used toward selection of a gift item from the gift inventory 121. The controller 102 is further configured to compute progress levels (for animated progress meters presented via the user interface) for any gift items available to be earned via game play. In some embodiments, the controller 102 uses the Elite Bonusing Suite™ product from Scientific Games Corporation, to set up promotions and specify conditions for earning, and tracking, rewards points towards gift fulfillment (see FIGS. 6A, 6B, 6C and FIG. 7 for a more detailed description).

Furthermore, while in some embodiments the system 100 provides physical gifts, other embodiments can otter credits for free play (which would not be part of the online store) such as $20 in free play. In some embodiments, the controller 102, for instance, detects player input that selects the free play as a gift. The controller 102 may utilize a bonusing application to add the free play credits to a credit meter at a gaming machine 104 (e.g., see credit meter 325 in FIG. 3A). In another example, the controller 102 loads the free play gift into a player account for later use by the player. The credits could be non-cashable (meaning the player couldn't simply cash them out for money) and could expire so that the player would need to use the credits by a certain time or else lose them.

Figure 2:
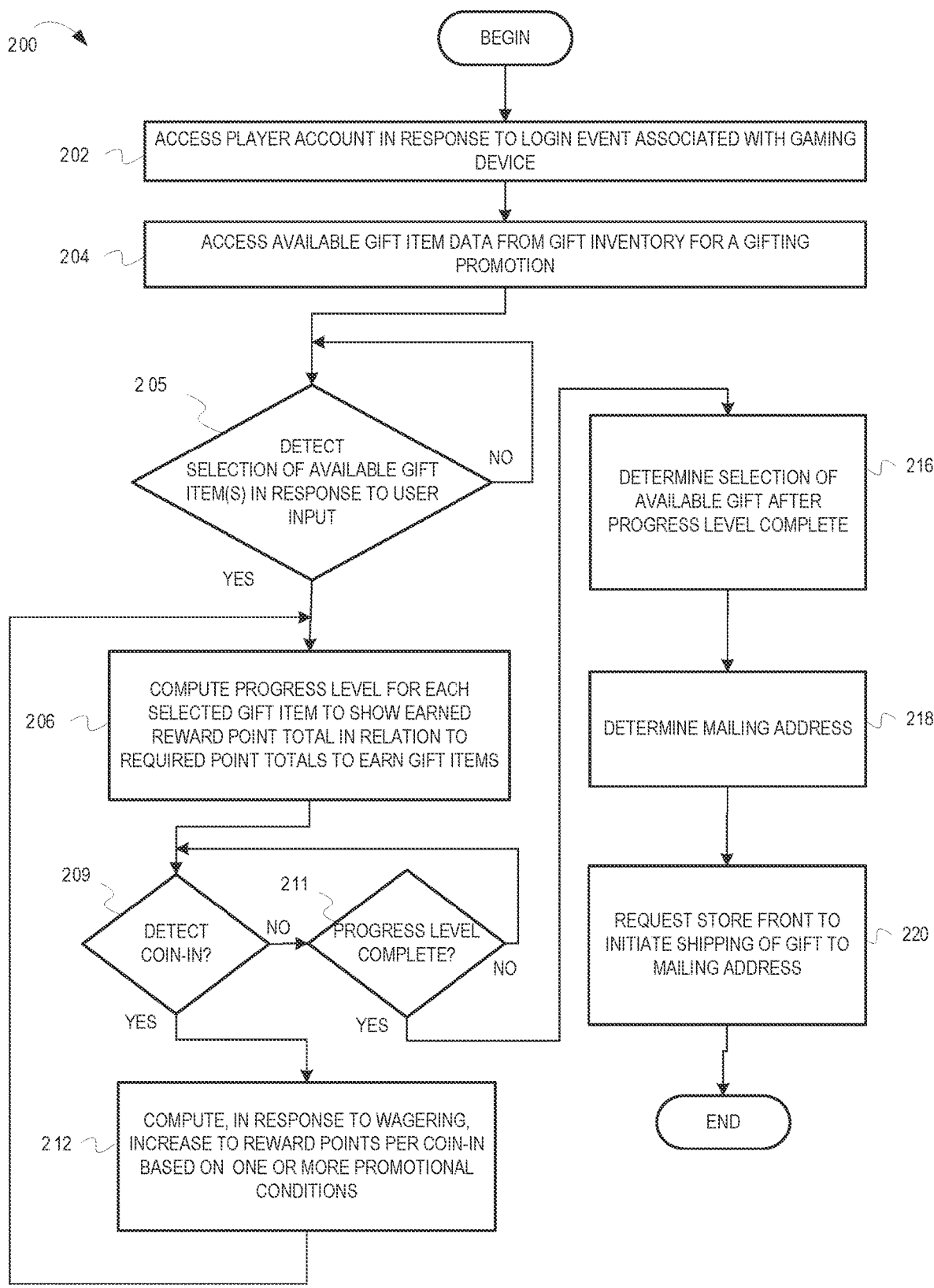
FIG. 2 illustrates an example of a method of according to one or more embodiments of the present disclosure.

FIG. 2 illustrates an example of a method of according to one or more embodiments of the present disclosure. FIGS. 3A, 3B, 4A, 4B, 5A, 5B, 6A, 6B, 6C, and 7 are diagrams associated with the data flow shown in FIG. 2 according to one or more embodiments of the present disclosure. FIGS. 3A, 3B, 4A, 4B, 5A, 5B, 6A, 6B, 6C, and 7 will be referenced in the description of FIG. 2.

Figures 3A, 3B:
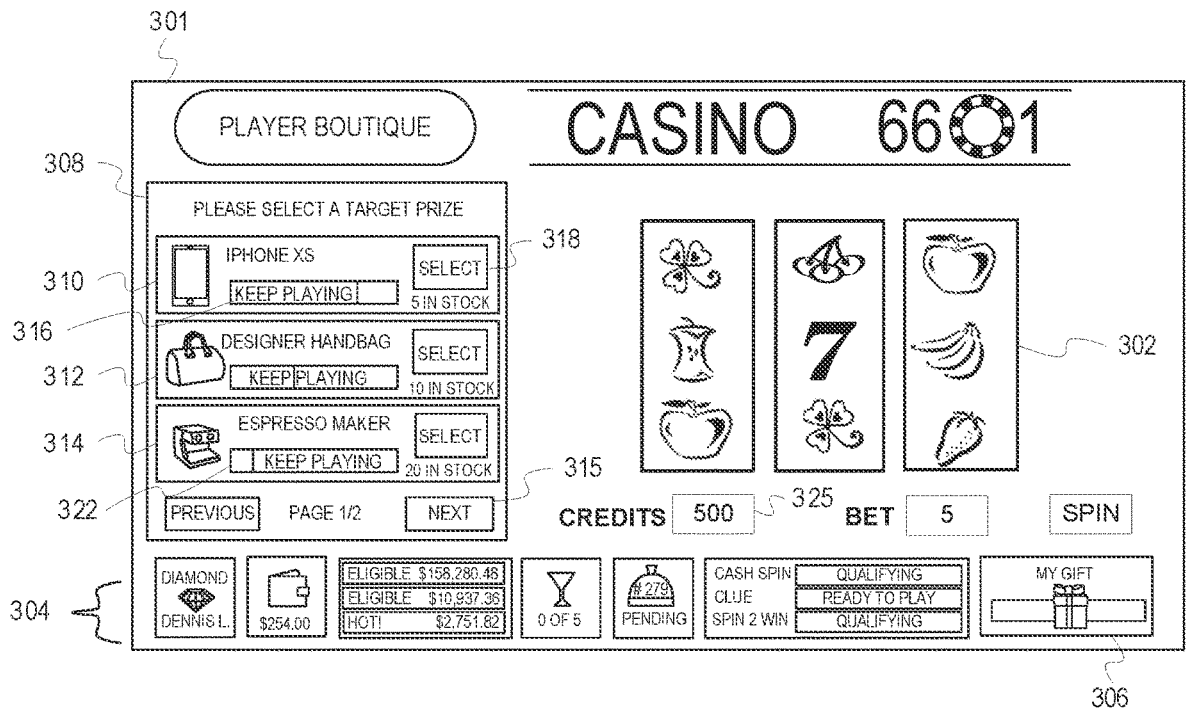
FIGS. 3A, 3B, 4A, and 4B are diagrams associated with the data flow of FIG. 2 according to one or more example embodiments in accordance with this disclosure.

In FIG. 2, a flow 200 begins at processing block 202 with accessing a player account. For instance, as shown in FIG. 3A, a player logs in to a player account session, such as via a swipe or insertion of a player account card at a gaming machine, via a manual entry of account credentials, etc. In one example, as described in FIG. 1, the controller 102 can access a player account via a login event at an iView 108. Once logged in, the controller 102 can present player-account specific data via a widget associated with the iView 108. For instance, the widget presents a combined, picture-in-picture example of a user interface 301. For instance, a gaming machine includes a main display. The gaming machine would normally present the gaming content 302 on the main display so as to take up the entire screen area on the main display. The iView 108, however, intercepts the image feed that contains the gaming content 302 and scales it down (in same or similar proportions as before), and fits the scaled-down gaming content 302 to the user interface 301, The user interface 301 surrounds the gaming content 302 with additional content related to the player account (e.g., the gaming content 302 is a picture-in-picture, surrounded by the "Player Boutique" dashboard content). The iView 108 presents the user interface 301 (including the combined picture-in-picture window with the gaming content 302 and the additional dashboard content as shown in FIG. 3A, for instance) to take up the entire screen area of the main display for the gaming machine. In one example, the user interface 301 includes an icon bar 304 with various icons related to different aspects of a player account. The icon bar 304, and other additional dashboard content, may be generated via the iView 108.

Referring back to FIG. 2, the flow 200 continues at processing block 204 with accessing available gift item data from a gift inventory. For instance, as shown in FIG. 3A, one icon 306, when selected, launches a gift tracking window 308. The window 308 specifies various gifts that are available to earn for a given promotion. For example, a first gill option 310 is for an "iPhone XS;" a second gift option 312 is for a "Designer Handbag;" a third gift option 314 is for a "Mini Expresso Machine;" etc. The window 308 can present any number of gift options. For example, the window 308 includes a scrolling control 315 to scroll through all of the available gifts for the promotion. For each of the gift items, the window 308 presents information about the gift (e.g., a picture of the gift item, a textual description of the gift item, a number of gift items still available in stock, etc.). Each of the gift items in the window 308 also includes a progress meter (e.g., progress meter 316) showing a level of progress (in reward points) toward earning that gift.

Referring momentarily back to FIG. 2, the flow 200 continues with detecting a selection of one or more available gift items in response to user input. For instance, as shown in FIG. 3A, each gift item in the window 308 includes a selection control (e.g., control 318 to select the "iPhone XS" gift item). In some instances, the gift item can be selected using the control 318 before the progress meter has shown as full. The system can highlight the selection. In some instances, the selection of the gift may cause the gift to be earmarked in the gift inventory for the player account (e.g., if the player account meets specific criteria, such as the progress meter being within a given percentage of completion, the player having a special status such as VIP status, etc.). In other instances, the selection of the gift item before it is earned causes the gift item to appear at the top of the list in the window 308. The window 308 further includes a label that the gift item was "chosen," within the window 308. The window 308 can show multiple selected gift items (before they are earned). The multiple selected gift items will be at the top of the list of the window 308, within view as game play proceeds. At any time during a gaming session that a "chosen" (yet unearned) gift item becomes unavailable (e.g., no more of that particular gift item exists in the gift inventory 121), the window 308 will reflect the gift item's unavailability. For example, the controller 102 periodically checks for gift availability throughout the duration of the gaming session.

Referring back to FIG. 2, the flow 200 continues at processing block 206 with computing a progress level for each of the selected gift items. For instance, the controller 102 can determine an earned reward point total for the player account. For instance, as shown in FIG. 3A, the controller 102 can access a data store associated with the player account to determine a current count of total rewards points earned to date. Each of those rewards points counts towards progress of earning any of the gift items. For example, the controller 102 may determine that the player account has three-hundred seventy five rewards points that have been earned in the gaming session, or in previous gaming sessions. The rewards points accrue over time via eligible gambling activities at eligible gaming machines. The rewards points persist within the player account until used to redeem at least one gift. In some embodiments, the controller 102 provides information about the progress level to the iView 108 to render an animation of a visual progress meter showing an earned reward point total in comparison to a required point total to earn the gift. For instance, as shown in FIG. 3A, the meter 316 shows a comparison of the three-hundred seventy five previously earned rewards points to the amount of reward points required to earn the "iPhone XS" gift (which requires one thousand reward points to redeem the gift). As a result, the controller 102 divides the amount of the earned reward point total (e.g., the 375 points earned by the player account) by the required point total (e.g., the 1000 required points for the "iPhone XS" gift), which comes to a value of 37.5%. The progress meter 316, therefore, shows as 37.5% full. The progress meter 316 may also indicate additional instructions (e.g., a message to "keep playing" because the progress meter 316 has not completely filled up yet). Other progress meters in the window 308 show relative values of progress toward that particular gift. For instance, the "Mini Espresso Machine" gift may only require four-hundred points to earn. Thus, the controller 102 divides the current earned reward point total (e.g. the 375 points earned by the player account) by the total required points for the gift (e.g., the 400 required reward points for the "Mini Espresso Machine" gift), which comes to a value of approximately 94%. Consequently, the progress meter 322 (for the "Mini Espresso Machine" gift) shows as 94% full.

Referring back to FIG. 2, the flow 200 continues at processing block 209 with detecting wagering (e.g., coin-in), via the player account, at an electronic game machine. For instance, as shown in FIG. 3A, a player account engages in additional play of the gaming content 302, For each wager made, a portion of the wager is eligible for reward points. Further, as mentioned previously, the reward points accrue, over a period of wagers (and/or gaming sessions) and are persistent in the player account until used to redeem gifts.

Referring back to FIG. 2, the flow 200 continues at processing block 212 with computing, in response to the wagering, an increase to the earned rewards points total per coin-in. For example, the controller 102 determines, based on conditions set for a gift promotion, a point value that is earned per amount of money wagered (i.e. per the coin-in). For example, as described in detail in FIG. 6A, 6B, 6C and FIG. 7, the controller 102 can be used to configure conditions that relate to an amount of rewards points that can be earned, as well as different formulas for computing the reward points, based on the conditions. For example, some gaming machines/game types may award rewards points on a one-to-one basis (e.g., $1 wagered equates to 1 earned reward point), whereas other machine types and/or other game types may award reward points on a different basis (e.g., reward points are earned according to a percentage of a theoretical adjusted bet). For example, in one instance, the controller 102 may detect that a first condition is set for a first type of gaming machine (e.g., a promotion is configured such that video poker machines, which have a theoretical payback of 98%, awards reward points at a first rate of 0.02 points per every $1 wagered). If the player switches game types (e.g., the player logs out of the video poker machine and logs in to a different gaming machine having a 90% theoretical payback of 90%), the controller 102 is configured to award reward points according to a different formulation (e.g., the controller 102 awards reward points at a second rate, such as 0.10 points per every $1 wagered).

Referring back to FIG. 2, after processing block 212, the flow 200 returns to processing block 206 and re-computes the progress level based on the increase to the reward points. For example, the controller 102 communicates the re-computed progress level to the iView 108 to animate a change to the visual meter that indicates the rewards point value earned. For instance, as shown in FIG. 3B, the player account makes additional wagers such that the reward point value earned increases, thus eventually causing each of the progress meters for each item to increase until full. The iView 108 presents the progress meter 316, in an animated fashion, to show an incremental change in the progress meter 316 as the reward points are being earned.

Referring again to FIG. 2, at processing block 211, the flow 200 continues with determining whether a progress level for any selected gift item is complete. For example, as shown in FIG. 3B, the progress meter 316 fills up and indicates that the player account has earned the gift item. For example, as shown in FIG. 3B, the player account eventually earns the required reward points for the "iPhone XS" gift (e.g., the player account eventually earns 1000 reward points).

Referring back to FIG. 2, the flow 200 continues at processing block 216 with determining a selection of at least one available gift after the required point total is reached. For instance, as shown in FIG. 3B, after the progress meter 316 fills up, the controller 102 instructs the iView 108 to present a user-interface control to claim the gift (e.g., the iView 108 presents control 330). The controller 102 detects user input that, for example, selects the control 330.

Figure 4A:
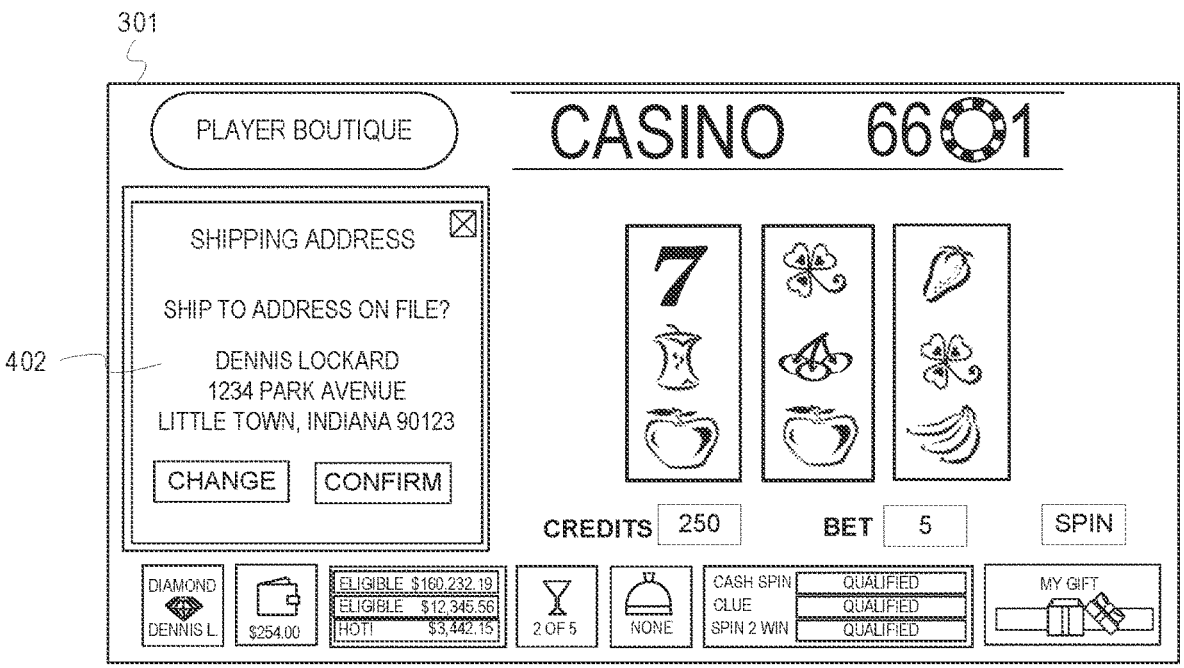
Figure 4B:
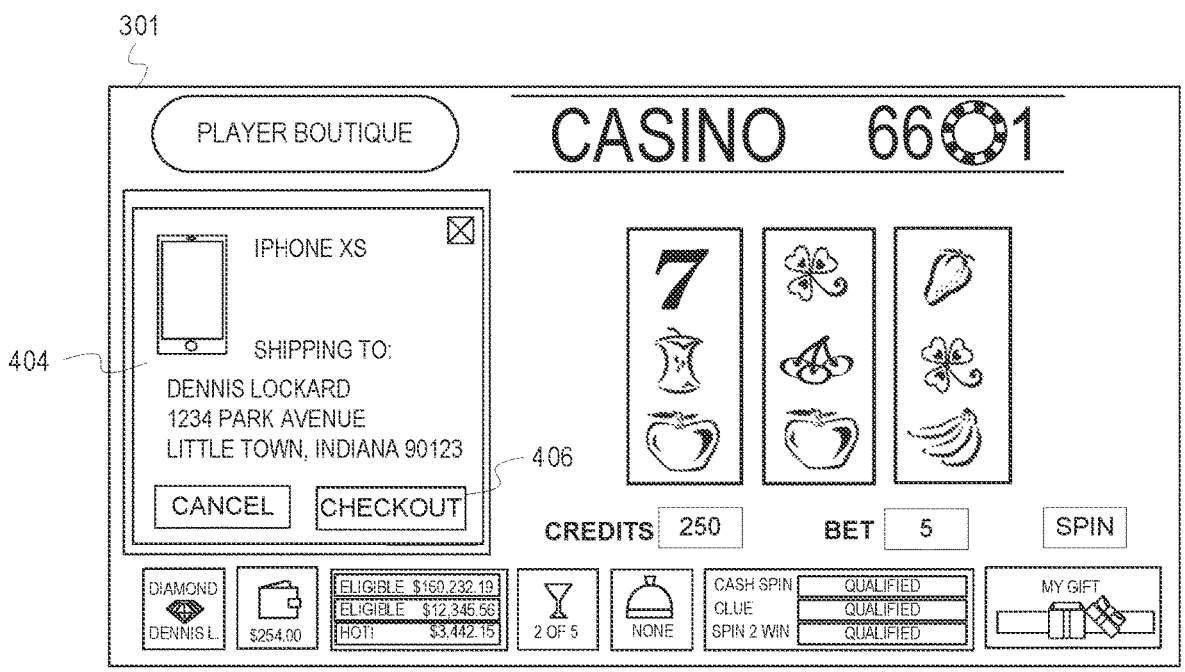

Referring back to FIG. 2, the flow 200 continues at processing block 218 with determining a mailing address associated with the player account. For instance, after the controller 102 detects the selection of the control 330 (as shown in FIG. 3B), as shown in FIG. 4A, the controller 102 presents (via the iView 108) a verification window 402 to verify the correct mailing address associated with the player account. If no mailing address is known for the player account, the verification window 402 may request user input to specify the mailing address. Once the mailing address is confirmed, the controller 102 presents (as shown in FIG. 4B), a checkout window 404. The controller 102 can detect, for instance, a selection of control 406 to "checkout," or rather, to complete the selection of the gift item from the gift inventory.

Referring back to FIG. 2, the flow 200 continues at processing block 220 with initiating the shipping of the gift to the specified mailing address. As mentioned in FIG. 1, the controller 102 can interface with a store front gateway 116, which interfaces with the store front server 115, The controller 102 initiates (via the store front gateway 116) an electronic transaction with the store front server 115 to process the purchase and shipping of the gift item on behalf of the player account. The controller 102 provides, via the transaction, the mailing address to the store front server 115. The store front server 115 receives the information about the gift item, selects the specific item from its inventory of available products, and uses the mailing address to ship the product.

Figure 5A:
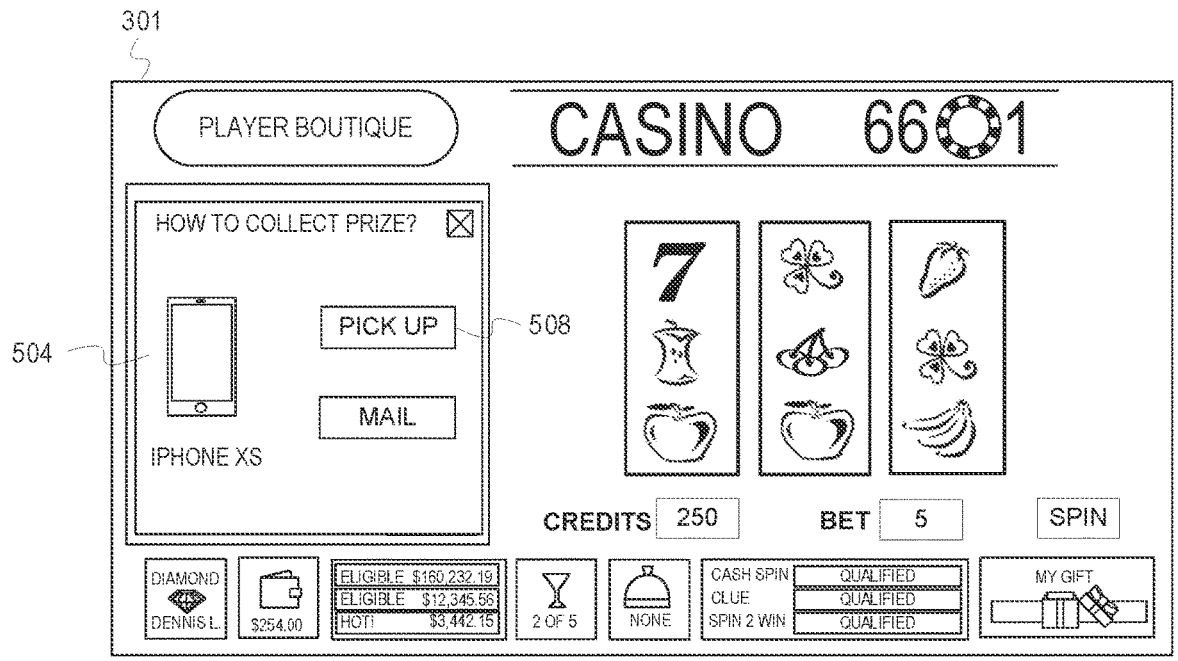
Figure 5B:
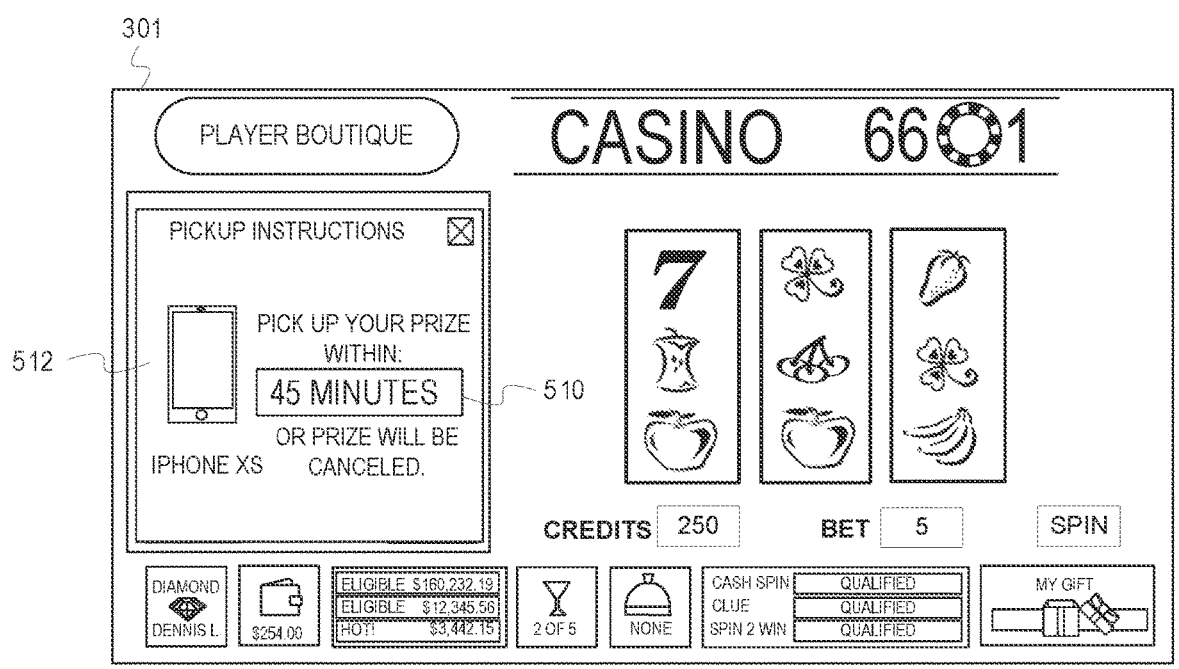

In an alternative embodiment, the system presents an option to either have the gift mailed to an address or to pick up the gift from a customer service desk at the casino. For instance, FIG. 5A illustrates a prize collection window 504 that provides the options to pick up the gift or have it mailed. In some examples, a casino may want to provide an option 508 to pick up a gift from an inventory of gifts stored at the casino. In this example, as shown in FIG. 5B, the controller 102 presents a pickup instructions window 512. The controller 102 also starts a count-down timer 510 indicating a set time period in which the selected gift will be reserved for the player, and by which time the player must pick up the selected gift from the customer service desk otherwise the gift will be released from being reserved and will return to the pool of available gift items for players. If the time runs out, the customer service desk may still fulfil the request if there is at least one unreserved gift items still available in the gift inventory.

Furthermore, referring back to processing block 212, the system determined a point value earned per coin-in. In some embodiments, the point value earned depends on conditions set for a promotion. For example, FIGS. 6A, 6B, 6C, and FIG. 7 illustrate examples of interfaces from which a gift promotion can be configured for presentation during a gaming session. In FIG. 6A, for instance, a promotions system (e.g., the Elite Bonusing Suite™ product from Scientific Games Corporation), includes a promotions scheduling tool 602 to configure a gift-giving promotion according to one or more embodiments described herein. The tool 602 specifies scheduling conditions 604, such as: a promotions start date/time; a number of hours and minutes for how long the promotion will run; an indicator as to whether the promotion starts immediately or by a specific time in the future; options to specify whether the promotion should run until cancelled, until a specific end date/time, or until inventory of the promoted gift runs out; an option to specify whether the promotion runs continuously (e.g., 24 hours. 7 days a week) or during limited times; etc.

FIG. 6B illustrates an example of configuring eligibility conditions for earning points. For example, a rewards points eligibility tool 610 specifies coin-in requirements for reward point accrual (i.e., the required conditions for a wager to count toward earning a reward point). The requirements for the point value accrual may change based on the type of wagering game being played, a grouping of gaming machines, a type of gaming machine device, a grouping of individuals, a player account status level, a type of bet, etc. For instance, the point value earned may be a direct proportion to an amount of money bet (e.g., $1 bet equates to 1 reward point). In another example, the point value earned may, instead, be a percentage of a theoretical adjusted bet amount. For example, the tool 610 includes a dropdown control 612 that specifies whether the wager made relates proportionally to the "Bet Amount" or to a "Theoretical Adj. Bet" (theoretical adjusted bet). When the "Bet Amount" option is selected, the system awards reward points according to a direct proportion of bets made (e.g., $1 bet equates to 1 point). If, however, the "Theoretical Adj. Bet" option is selected, the system awards reward points according a percentage of the theoretical adjusted bet amount. The theoretical adjusted bet amount is the amount of profit that the casino derives from the betting. For instance, some gaming machines have a theoretical payback, whereby the gaming machine must pay back (on average) a given amount of bets made by patrons at the gaming machine. For instance, some gaming jurisdictions require paybacks over 80%, some as high as 98%. So, for example, a slot machine that had a theoretical payback of 98% means that the casino, on average, only receives a 2% profit on the gaming machine. Thus, if the dropdown 612 specifies the theoretical adjusted bet, then that would mean only the portion of the bet that the casino earns the 2% profit on a machine with a 98% theoretical payback) counts toward earning a rewards point (e.g., $1 bet equates to 0.02 rewards points).

The tool 610 also includes options 614 to specify a conditional rule, such as specifying a group of machines based on a selected game type. The conditional rule gives a flexibility to specify different promotion costs based on a player playing a specific type of gaming machine or specific type of game offered by the gaming machine. For example, as shown in FIG. 6B, the options 614 also include specifying that a machine that does not meet the conditions (e.g., gaming machines with games other than Poker and Black Jack), require a higher percentage of the wager to earn reward points (e.g., non-conditional machines require 125% of the wager, which is higher than that for a conditional machine). Furthermore, (as shown in FIG. 6C) the system can set a condition where a specific type of machine (e.g., machines that present Poker and Black Jack games) require a $5 bet to be eligible to earn reward points. Any other type of machine/game would require a $10 bet to be eligible to earn reward points.

FIG. 7 illustrates an example of a tool 710 that specifies details about the promotion, particularly about the gifts or "prizes" that are available and the requirements to earn the gift. For example, the tool 710 includes a control 715 to specify a condition for a prize type 715 (e.g. a "laptop" computer is offered as the gift). The tool 710 also includes a control 716 to specify a condition for a number of prizes available (e.g., "10" laptops are available from the gift inventory). A control 717 specifies a limit on a number of the prizes any particular player account can redeem (e.g., the player account can only redeem "2" laptops out of the "10" available). A control 718 specifies a condition for how many rewards points (or equivalent total wager amount associated with the required reward points) are needed to earn the gift (e.g., a player account must accrue at least "1000" reward points to win the laptop). A control 719 further specifies a condition for how many rewards points (or equivalent total wager amount associated with the required reward points) are needed to earn the gift at a "conditional" machine (as described previously). The tool 710 also includes a table 720 indicating all of the gifts that are available in the gift inventory and their specific conditions.

Figure 8:
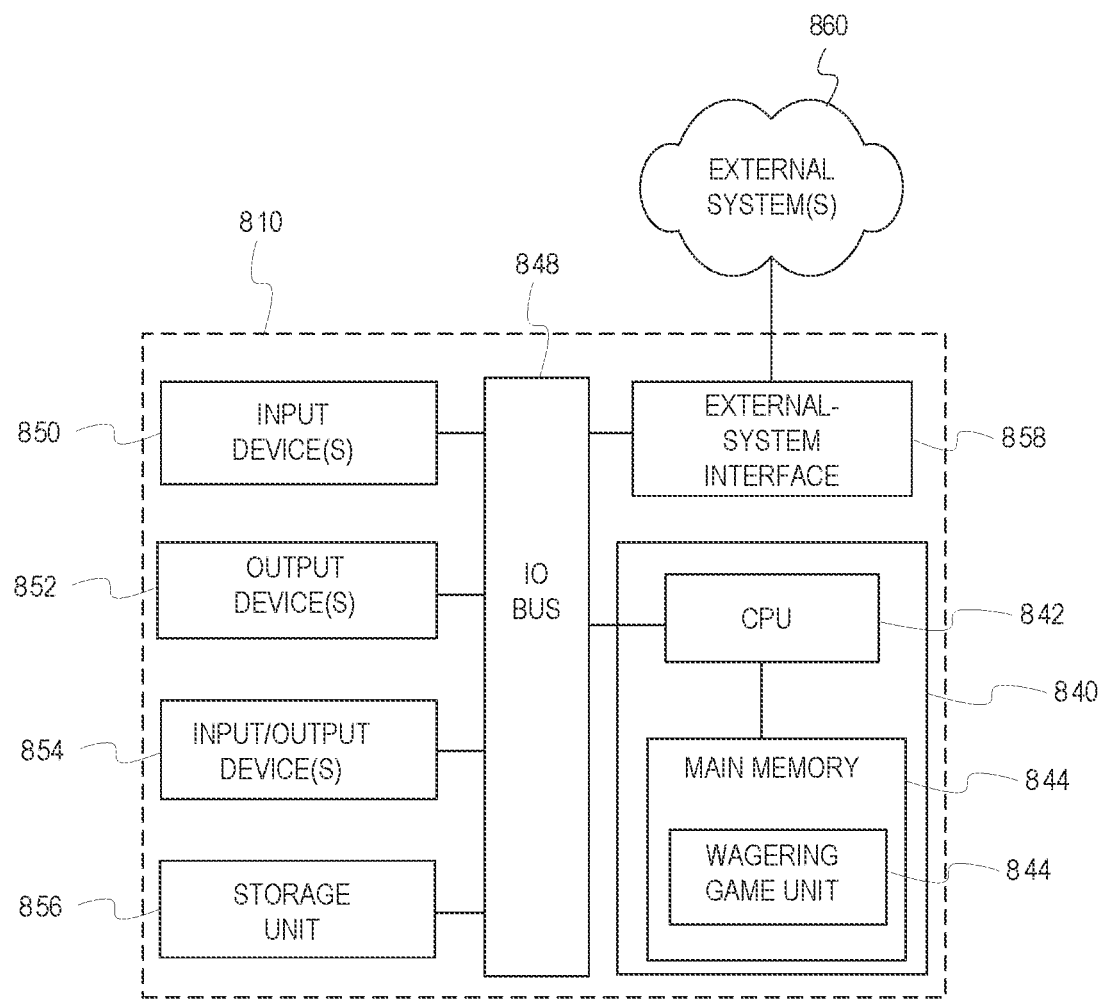
FIG. 8 is a schematic view of a gaming system according to one or more embodiments of the present disclosure.

FIG. 8 is schematic view of a gaming system according to at least some aspects of the disclosed concepts. Referring to FIG. 8, a gaming machine 810 includes game-logic circuitry 840 (e.g., securely housed within a locked box inside a gaming cabinet). The game-logic circuitry 840 includes a central processing unit (CPU) 842 connected to a main memory 844 that comprises one or more memory devices. The CPU 842 includes any suitable processor(s), such as those made by Intel and AMD. By way of example, the CPU 842 includes a plurality of microprocessors including a master processor, a slave processor, and a secondary or parallel processor. Game-logic circuitry 840, as used herein, comprises any combination of hardware, software, or firmware disposed in or outside of the gaming machine 810 that is configured to communicate with or control the transfer of data between the gaming machine 810 and a bus, another computer, processor, device, service, or network. The game-logic circuitry 840, and more specifically the CPU 842, comprises one or more controllers or processors and such one or more controllers or processors need not be disposed proximal to one another and may be located in different devices or in different locations. The game-logic circuitry 840, and more specifically a main memory 844, comprises one or more memory devices which need not be disposed proximal to one another and may be located in different devices or in different locations. The game-logic circuitry 840 is operable to execute all of the various gaming methods and other processes disclosed herein. The main memory 844 includes a wagering-game unit 846. In one embodiment, the wagering-game unit 846 causes wagering games to be presented, such as video poker, video black jack, video slots, video lottery, etc., in whole or part.

The game-logic circuitry 840 is also connected to an input/output (110) bus 848, which can include any suitable bus technologies, such as an AGTL+frontside bus and a PCI backside bus. The I/O bus 848 is connected to various input devices 850, output devices 852, and input/output devices 854.

By way of example, the output devices may include a primary display, a secondary display, and one or more audio speakers. The primary display or the secondary display may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, email s, alerts, announcements, broadcast information, subscription information, etc. appropriate to the particular mode(s) of operation of the gaming machine 810. The gaming machine 810 can also include a touch screen(s) mounted over the primary or secondary displays, buttons on a button panel, a bill/ticket acceptor, a card reader/writer, a ticket dispenser, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, buttons, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game), The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The input/output devices 854 include one or more value input/payment devices and value output/payout devices. In order to deposit cash or credits onto the gaming machine 810, the value input devices are configured to detect a physical item associated with a monetary value that establishes a credit balance on a credit meter such as a "credits" meter (e.g., credit meter 325 in FIG. 3A). The physical item may, for example, be currency bills, coins, tickets, vouchers, coupons, cards, and/or computer-readable storage mediums. The deposited cash or credits are used to fund wagers placed on the wagering game played via the gaming machine 810. Examples of value input devices include, but are not limited to, a coin acceptor, a bill/ticket acceptor, a card reader/writer, a wireless communication interface for reading cash or credit data from a nearby mobile device, and a network interface for withdrawing cash or credits from a remote account via an electronic funds transfer. In response to a cashout input that initiates a payout from the credit balance on the "credits" meter (e.g., credit meter 325 in FIG. 3A), the value output devices are used to dispense cash or credits from the gaming machine 810. The credits may be exchanged for cash at, for example, a cashier or redemption station. Examples of value output devices include, but are not limited to, a coin hopper for dispensing coins or tokens, a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

The I/O bus 848 is also connected to a storage unit 856 and an external-system interface 858, which is connected to external system(s) 860 (e.g., wagering-game networks, communications networks, etc.).

The external system(s) 860 includes, in various aspects, a gaming network, other gaming machines or terminals, a gaming server, a remote controller, communications hardware, or a variety of other interfaced systems or components, in any combination. In yet other aspects, the external system(s) 860 comprises a player's portable electronic device (e.g., cellular phone, electronic wallet, etc.) and the external-system interface 858 is configured to facilitate wireless communication and data transfer between the portable electronic device and the gaming machine 810, such as by a near-field communication path operating via magnetic-field induction or a frequency-hopping spread spectrum RF signals (e.g., Bluetooth, etc.).

The gaming machine 810 optionally communicates with the external system(s) 860 such that the gaming machine 810 operates as a thin, thick, or intermediate client. The game-logic circuitry 840 whether located within ("thick client"), external to ("thin client"), or distributed both within and external to ("intermediate client") the gaming machine 810 is utilized to provide a wagering game on the gaming machine 810. In general, the main memory 844 stores programming for a random number generator (RNG), game-outcome logic, and game assets (e.g., art, sound, etc.)—all of which obtained regulatory approval from a gaming control board or commission and are verified by a trusted authentication program in the main memory 844 prior to game execution. The authentication program generates a live authentication code (e.g., digital signature or hash) from the memory contents and compares it to a trusted code stored in the main memory 844. If the codes match, authentication is deemed a success and the game is permitted to execute. If, however, the codes do not match, authentication is deemed a failure that must be corrected prior to game execution. Without this predictable and repeatable authentication, the gaming machine 810, external system(s) 860, or both are not allowed to perform or execute the RNG programming or game-outcome logic in a regulatory-approved manner and are therefore unacceptable for commercial use In other words, through the use of the authentication program, the game-logic circuitry facilitates operation of the game in a way that a person making calculations or computations could not.

When a wagering-game instance is executed, the CPU 842 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 842 when executing the game-outcome logic to determine a resultant outcome for that instance of the wagering game. The resultant outcome is then presented to a player of the gaming machine 810 by accessing the associated game assets, required for the resultant outcome, from the main memory 844. The CPU 842 causes the game assets to be presented to the player as outputs from the gaming machine 810 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 810 may be used to play central determination games, such as electronic pull-tab and bingo games. In an electronic pull-tab game, the RN G is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 810 may include additional peripheral devices or more than one of each component shown in FIG. 8. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 9:
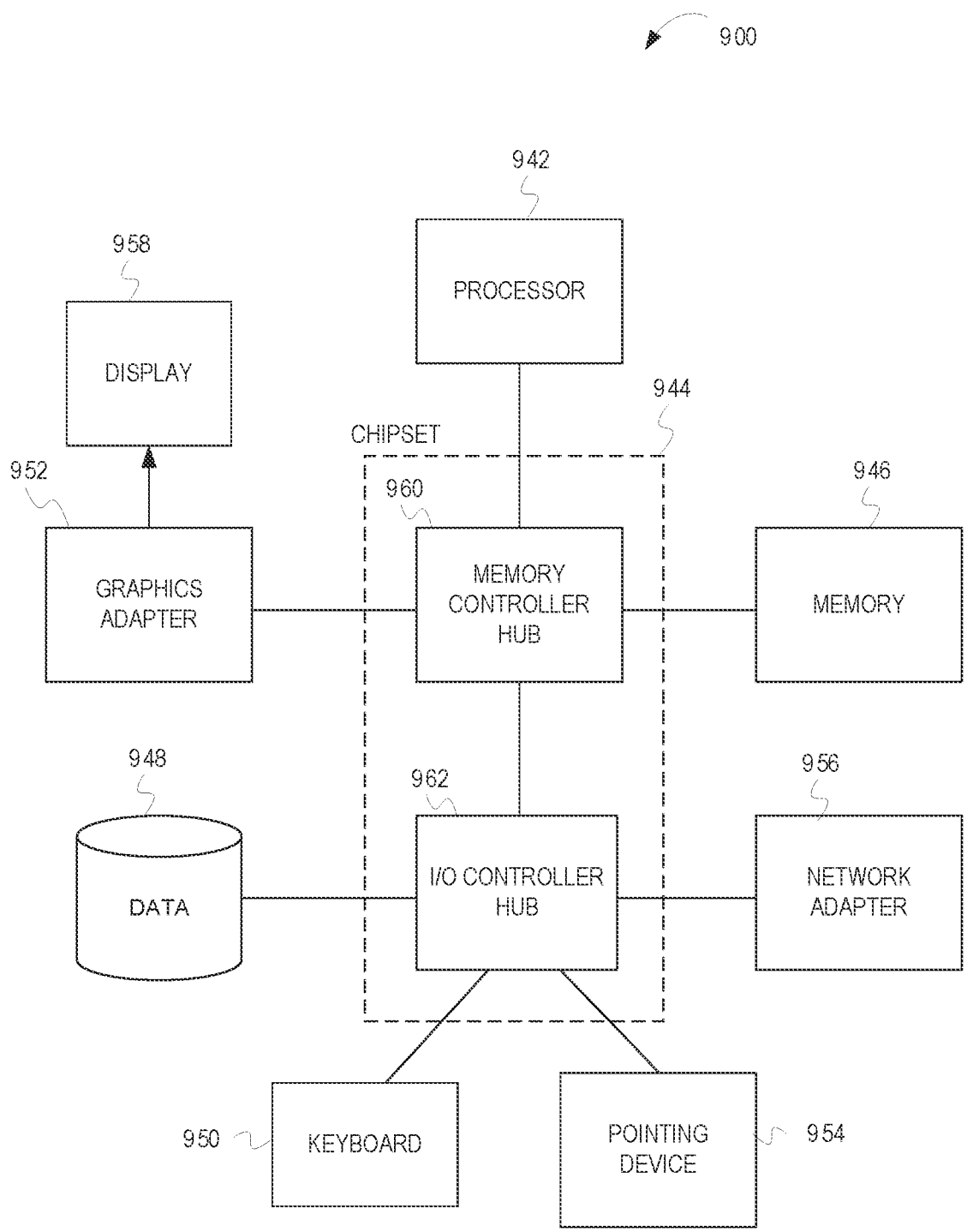
FIG. 9 is a block diagram of a computer system 900 according to one or more embodiments of the present disclosure.

FIG. 9 is shown a block diagram of a computer system 900 according to one or more embodiments. The computer system 900 includes at least one processor 942 coupled to a chipset 944, as indicated in dashed lines. Also coupled to the chipset 944 are memory 946, a storage device 948, a keyboard 950, a graphics adapter 952, a pointing device 954, and a network adapter 956. A display 958 is coupled to the graphics adapter 952. In one embodiment, the functionality of the chipset 944 is provided by a memory controller hub 960 and an 110 controller hub 962. In another embodiment, the memory 946 is coupled directly to the processor 942 instead of to the chipset 944.

The storage device 948 is any non-transitory computer-readable storage medium, such as a hard drive, a compact disc read-only memory (CD-ROM), a DVD, or a solid-state memory device (e.g., a flash drive). The memory 946 holds instructions and data used by the processor 942. The pointing device 954 may be a mouse, a track pad, a track ball, or another type of pointing device, and it is used in combination with the keyboard 950 to input data into the computer system 900. The graphics adapter 952 displays images and other information on the display 958. The network adapter 956 couples the computer system 900 to a local or wide area network.

As is known in the art, the computer system 900 can have different and/or other components than those shown in FIG. 9. In addition, the computer system 900 can lack certain illustrated components. In one embodiment, the computer system 900 acting as the controller 102 (FIG. 1) may lack the keyboard 950, pointing device 954, graphics adapter 952, and/or display 958. Moreover, the storage device 948 can be local and/or remote from the computer system 900 (such as embodied within a storage area network (SAN)). Moreover, other input devices, such as, for example, touch screens may be included.

The network adapter 956 (may also be referred to herein as a communication device) may include one or more devices for communicating using one or more of the communication media and protocols discussed above with respect to FIG. 1, FIG. 8, etc.

In addition, some or all of the components of this general computer system 900 of FIG. 9 may be used as part of the processor and memory discussed above with respect to the systems or devices described for FIG. 1, FIG. 2, FIG. 3A, FIG. 3B, FIG. 4A, FIG. 4B, FIG. 5A, FIG. 5B, FIG. 6A. FIG. 6B, FIG. 6C, FIG. 7, or FIG. 8.

In some embodiments, a gaming system (e.g., controller 102) may comprise several such computer systems 900. The gaming system may include load balancers, firewalls, and various other components for assisting the gaming system to provide services to a variety of user devices.

The computer system 900 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 948, loaded into the memory 946, and executed by the processor 942.

FIG. 2, described by way of example above, represents one data processing method (e.g, algorithm) that corresponds to at least some instructions stored and executed by the game-logic circuitry associated with any of the systems or devices described for FIG. 1, FIG. 2, FIG. 3A, FIG. 3B, FIG. 4A, FIG. 4B, FIG. 5A, FIG. 5B, FIG. 6A, FIG. 6B, FIG. 6C, FIG. 7, FIG. 8 or FIG. 9 to perform the above described functions associated with the disclosed concepts.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method comprising:

logging in, by a processor associated with a gaming device connected to a communications network, a player account to an account server in response to a login event associated with the gaming device;

animating, by the processor via a display of the gaming device, available gift item data from an inventory of earnable gift items for a gifting promotion;

electronically transforming, by the processor in response to animating the available gift item data, first user input accepted via a user interface of the gaming device to first electronic data, wherein the first user input indicates a user selection of a gift item from the inventory, wherein the first user input occurs prior to the gift item being earned and prior to occurrence of one or more gaming sessions of a wagering game, wherein the selected gift item has a required customer-loyalty point total in order to be earned;

electronically transforming, by the processor after transforming the first user input, one or more second user inputs accepted during the one or more gaming sessions to second electronic data, wherein transforming the one or more second user inputs to the second electronic data causes the processor to automatically accrue, based on the second electronic data, a number of customer-loyalty reward points, wherein accrual of the number of customer-loyalty reward points causes a level of wagering progress, by the player account toward earning the gift item, to reach a required progress level, wherein transforming the one or more second user inputs comprises automatic comparison, by the processor, of the required customer-loyalty point total to the number of customer-loyalty reward points automatically accrued via the one or more second user inputs;

animating, by the processor via a graphical progress meter presented via the display, the number of customer-loyalty reward points in relation to the required customer-loyalty point total, wherein the graphical progress meter indicates that the number of customer-loyalty reward points equates to the required customer-loyalty point total;

in response to detecting, by the processor, that the graphical progress meter indicates that the number of customer-loyalty reward points equates to the required customer-loyalty point total, copying, by the processor via electronic access to the player account, third electronic data that specifies a mailing address associated with the player account; and conducting, by the processor via the communications network, an electronic transaction using the third electronic data that specifies the mailing address, wherein the electronic transaction instructs a server associated with a store front to initiate a shipping transaction to ship a physical instance of the gift item to the mailing address.

2. The method of claim 1, further comprising:

computing, by the processor, the level of wagering progress in response to detecting an accumulated amount of wagering performed by the player account via a plurality of gaming sessions, wherein the one or more gaming sessions comprise the plurality of gaming sessions.

3. The method of claim 2, further comprising:

detecting, by the processor, the accumulated amount of wagering performed by the player account via a plurality of gaming devices used for the plurality of gaming sessions, wherein the gaining device is one of the plurality of gaming devices.

4. The method of claim 3 further comprising:

determining, by the processor, that the required progress level is lower for a first type of the plurality of gaming devices that has a first theoretical payback percentage than for a second type of the plurality of gaming devices that has a second theoretical payback percentage; and computing the level of wagering progress in response to determining that the gaming device is either the first type or the second type based on the first theoretical payback percentage being different from the second theoretical payback percentage.

5. The method of claim 4, wherein the first type of the plurality of gaming devices comprises at least one of a Poker type of gaming device or a Black Jack type of gaming device, and the second type comprises a type other than either the Poker type of gaming device or the Black Jack type of gaming device.

6. The method of claim 2 further comprising:
awarding, by the processor after transforming the one or more second user inputs, the number of earned customer-loyalty reward points; and
animating, by the processor in response to the awarding, an appearance of the number of earned customer-loyalty reward points via a graphical user interface accessible via the gaming device.

7. The method of claim 6, wherein the animating the appearance of the number of earned customer-loyalty reward points comprises:
rendering, by the processor, the graphical progress meter, wherein the graphical progress meter is configured to indicate the level of wagering progress toward earning the gift item;
illustrating, by the processor via the graphical progress meter presented on the display during the one or more gaming sessions, the number of earned customer-loyalty reward points in relation to the required customer-loyalty point total for the gift item; and
presenting, by the processor, the graphical progress meter via the graphical user interface.

8. The method of claim 7, wherein the illustrating comprises illustrating each of the number of earned customer-loyalty reward points incrementally on the graphical progress meter as each of the number of earned customer-loyalty reward points is awarded.

9. The method of claim 1, further comprising:
presenting, by the processor, a plurality of gift items offered via the gifting promotion, wherein the gift item is one of the plurality of gift items, wherein the plurality of gift items are accessible via one or more third-party store fronts, wherein the store front is one of the one or more third-party store fronts;
animating, by the processor, additional electronic data for the plurality of gift items, wherein the additional electronic data specifies availability of the plurality of the gift items to be selected and earned;
detecting, by the processor in response to animating the additional electronic data for the plurality of gift items, a plurality of user selections from the plurality of gift items prior to any of the selected ones of the plurality of gift items being earned, wherein said user selection of the gift item is one of the plurality of user selections;
animating, by the processor via the user interface of the gaming device, a concurrent presentation of a plurality of progress meters, wherein each of the plurality of progress meters is associated respectively with each respective gift item selected via the plurality of user selections; and
awarding, by the processor in response to tracking the level of wagering progress during the one or more gaming sessions, a respective number of customer-loyalty reward points earned for the each respective gift item selected.

10. The method of claim 9, wherein the concurrent presentation of the plurality of progress meters indicates a concurrent change in each of the plurality of progress meters as game play proceeds during the one or more gaming sessions.

11. The method of claim 9, wherein the concurrent presentation comprises presenting, via each one of the plurality of progress meters, a different relative level of progress toward the each respective gift item selected.

12. The method of claim 11, wherein the presenting the different relative level of progress comprises presenting, for the each of the plurality of progress meters, a comparison of a total earned reward point total for the player account divided by an amount of required customer-loyalty reward points for the each respective gift item selected.

13. The method of claim 9, further comprising:
determining, by the processor during the one or more gaming sessions, that a selected gift item becomes unavailable from the inventory before a respective one of the plurality of progress meters indicates completion; and
in response to determining that the selected gift item becomes unavailable, animating, by the processor via the user interface during the one or more gaming sessions, an indication that the selected gift item is unavailable.

14. The method of claim 1, wherein the conducting the electronic transaction comprises transmitting, by the processor via the communications network, both the mailing address and an indication of the gift item to the server of the store front.

15. A gaming system comprising:
a network interface configured to connect to a communication network; and
a processor configured to execute instructions, which when executed perform operations that cause the gaming system to:
login a player account to an account server in response to a login event associated with a gaming device;
animate, via a display of the gaming device, available gift item data from a gift inventory of earnable gift items for a gifting promotion;
electronically transform, in response to animation of the available gift item data, first user input accepted via a user interface of the gaming device to first electronic data, wherein the first user input indicates a user selection of a gift item from the gift inventory prior to the gift item being earned and prior to occurrence of one or more gaining sessions, wherein the selected gift item has a required customer-loyalty point total in order to be earned, and wherein the gift item is accessible via a third-party store front;
electronically transform, after transformation of the first user input, one or more second user inputs accepted during the one or more gaming sessions to second electronic data, wherein transforming the one or more second user inputs to the second electronic data causes the processor to automatically accrue, based on the second electronic data, a number of customer-loyalty, reward points, wherein accrual of the number of customer-loyalty reward points causes a level of wagering progress, by the player account toward earning the gift item, to reach a required progress level, wherein transformation of the one or more second user inputs comprises automatic comparison, by the processor, of the required customer-loyalty point total to the number of customer-loyalty reward points automatically accrued via the one or more second user inputs;
animate, via a graphical progress meter presented via the display, the number of customer-loyalty reward points in relation to the required customer-loyalty point total, wherein the graphical progress meter indicates that the number of customer-loyalty reward points equates to the required customer-loyalty point total;

in response to detection that the graphical progress meter indicates that the number of customer-loyalty reward points equates to the required customer-loyalty point total, copy, via the electronic access to the player account, third electronic data that specifies a mailing address associated with the player account; and conduct, via the communication network, an electronic transaction using the third electronic data that specifies the mailing address, wherein the electronic transaction instructs a server associated with the third-party store front to initiate a shipping transaction to ship a physical instance of the gift item to the mailing address.

16. The gaming system of claim 15, wherein the processor is further configured to execute instructions, which when executed perform operations that cause the gaming system to:

compute the level of wagering progress in response to detecting an accumulated amount of wagering performed by the player account via a plurality of gaming sessions, wherein the one or more gaming sessions comprise the plurality of gaming sessions.

17. The gaming system of claim 15, wherein the processor is further configured to execute instructions, which when executed perform operations that cause the gaming system to:

award, after transformation of the one or more second user inputs, the number of earned customer-loyalty reward points; and animate, in response to the number of earned customer-loyalty reward points being awarded, an appearance of the number of earned customer-loyalty reward points via a graphical user interface accessible via the gaming device.

18. The gaming system of claim 17, wherein the processor is further configured to execute instructions, which when executed perform operations that cause the gaming system to:

render the graphical progress meter, wherein the graphical progress meter is configured to indicate the level of wagering progress toward earning the gift item;

illustrate, via the graphical progress meter, incrementally each of the number of earned customer-loyalty reward points in relation to the required customer-loyalty point total for the gift item as each of the number of earned customer-loyalty reward points is awarded, wherein the required customer-loyalty point total equates to the required progress level; and present the graphical progress meter via the graphical user interface.

19. The gaming system of claim 15, wherein the processor is further configured to execute instructions, which when executed perform operations that cause the gaming system to:

present a plurality of gift items offered via the gifting promotion, wherein the gift item is one of the plurality of gift items, wherein the plurality of gift items are accessible via one or more third-party store fronts, wherein the third-party store front is one of the one or more third-party store fronts;

animate additional electronic data for the plurality of gift items, wherein the additional electronic data specifies availability of the plurality of gift items to be selected and earned;

detect, in response to animating the additional electronic data for the plurality of gift items, a plurality of user selections from the plurality of gift items prior to any of the selected ones of the plurality of gift items being earned, wherein the user selection of the gift item is one of the plurality of user selections; and animate, via the user interface of the gaming device, a concurrent presentation of a plurality of progress meters, wherein each of the plurality of progress meters is associated respectively with each respective gift item selected via the plurality of user selections.

20. The gaming system of claim 19, wherein the concurrent presentation of the plurality of progress meters indicates a concurrent change in each of the plurality of progress meters as game play proceeds during the one or more gaming sessions, wherein the concurrent presentation comprises presentation, via each one of the plurality of progress meters, of a different relative level of progress toward the each respective gift item selected, wherein presentation of the different relative level of progress comprises presentation, for the each of the plurality of progress meters, of a comparison of a total earned reward point total for the player account divided by an amount of required reward points for the each respective gift item selected.

21. One or more non-transitory, computer-readable media having instructions stored thereon, wherein the instructions, when executed by one or more processors, cause a gaming system to perform operations comprising:

logging in, via a gaming device connected to a communications network, a player account to an account server in response to a login event associated with the gaming device;

animating, via a display of the gaming device, available gift item data from an inventory of earnable gift items for a gifting promotion;

electronically transforming, in response to animating the available gift item data, first user input accepted via a user interface of the gaming device to first electronic data, wherein the first user input indicates a user selection of a gift item from the inventory, wherein the first user input occurs prior to the gift item being earned and prior to occurrence of one or more gaming sessions of a wagering game, wherein the selected gift item has a required customer-loyalty point total in order to be earned;

electronically transforming, after transforming the first user input, one or more second user inputs accepted during the one or more gaming sessions to second electronic data, wherein transforming the one or more second user inputs to the second electronic data causes the processor to automatically accrue, based on the second electronic data, a number of customer-loyalty reward points, wherein accrual of the number of customer-loyalty reward points causes a level of wagering progress, by the player account toward earning the gift item, to reach a required progress level, wherein transforming the one or more second user inputs comprises automatic comparison, by the processor, of the required customer-loyalty point total to the number of customer-loyalty reward points automatically accrued via the one or more second user inputs;

animating, via a graphical progress meter presented via the display, the number of customer-loyalty reward points in relation to the required customer-loyalty point total, wherein the graphical progress meter indicates that the number of customer-loyalty reward points equates to the required customer-loyalty point total;

in response to detecting that the graphical progress meter indicates that the number of customer-loyalty reward points equates to the required customer-loyalty point total, copying, via electronic access to the player account, third electronic data that specifies a mailing address associated with the player account; and conducting, via the communications network, an electronic transaction using the third electronic data that specifies the mailing address, wherein the electronic transaction instructs a server associated with a store front to initiate a shipping transaction to ship a physical instance of the gift item to the mailing address.

* * * * *